United States Patent
Boock

(10) Patent No.: US 8,337,179 B2
(45) Date of Patent: Dec. 25, 2012

(54) DEVICE FOR REDUCING HYDRAULIC-FLUID OSCILLATION IN A HYDRAULIC SYSTEM

(75) Inventor: Klaus Boock, Timmdorf (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 12/086,205

(22) PCT Filed: Dec. 5, 2006

(86) PCT No.: PCT/EP2006/011676
§ 371 (c)(1),
(2), (4) Date: Sep. 17, 2009

(87) PCT Pub. No.: WO2007/065640
PCT Pub. Date: Jun. 14, 2007

(65) Prior Publication Data
US 2010/0018199 A1    Jan. 28, 2010

Related U.S. Application Data

(60) Provisional application No. 60/780,553, filed on Mar. 9, 2006.

(30) Foreign Application Priority Data

Dec. 8, 2005   (DE) .......................... 10 2005 058 547

(51) Int. Cl.
*F04B 11/00*   (2006.01)
(52) U.S. Cl. ...................................................... 417/540
(58) Field of Classification Search .............. 417/279, 417/540, 440
See application file for complete search history.

(56) References Cited

U.S. PATENT DOCUMENTS

| 4,750,523 | A | | 6/1988 | Crouse |
| 5,065,959 | A | | 11/1991 | Bhatia et al. |
| 5,492,451 | A | * | 2/1996 | Franz et al. .................... 417/312 |
| 5,694,765 | A | * | 12/1997 | Hield et al. ................. 60/39.163 |
| 5,785,815 | A | | 7/1998 | Munch et al. |
| 5,791,141 | A | * | 8/1998 | Phillips .......................... 60/327 |
| 6,016,739 | A | * | 1/2000 | Baehler .......................... 92/172 |
| 6,601,054 | B1 | | 7/2003 | Lo et al. |
| 6,605,818 | B1 | | 8/2003 | Cornog et al. |
| 6,658,118 | B1 | | 12/2003 | Kumar et al. |
| 6,854,269 | B2 | * | 2/2005 | Hale ............................... 60/417 |
| 2005/0129531 | A1 | * | 6/2005 | Fenny et al. ................... 417/269 |
| 2006/0130919 | A1 | | 6/2006 | Ehmann et al. |

FOREIGN PATENT DOCUMENTS

| DE | 4302977 | 3/1994 |
| DE | 10316946 | 10/2004 |
| JP | 03-51955 | 3/1991 |
| JP | 03-169799 | 7/1991 |
| JP | 04-128573 | 4/1992 |

(Continued)

*Primary Examiner* — Devon Kramer
*Assistant Examiner* — Bryan Lettman
(74) *Attorney, Agent, or Firm* — Lerner, David, Littenberg, Krumholz & Mentlik, LLP

(57) ABSTRACT

A device for reducing hydraulic-fluid oscillation in a hydraulic system, in particular in a hydraulic system of an aircraft, wherein the hydraulic system comprises a pump that is driven by a drive, which pump conveys a fluid to a hydraulic line by pressure pulsation. The device comprises an actuator, arranged in the hydraulic line for generating pressure pulsation that compensates for the pressure pulsation of the pump.

13 Claims, 1 Drawing Sheet

FOREIGN PATENT DOCUMENTS

| | | |
|---|---|---|
| JP | 05-503480 | 6/1993 |
| JP | 5-180390 | 7/1993 |
| JP | 05-180390 | 7/1993 |
| JP | 07-198087 | 8/1995 |
| JP | 2006522891 A | 10/2006 |
| SU | 945690 A1 | 7/1982 |
| SU | 1366733 A1 | 1/1988 |
| SU | 1564408 A1 | 5/1990 |
| SU | 1668731 A1 | 8/1991 |
| WO | 9110575 A1 | 7/1991 |
| WO | 98/55060 | 12/1998 |

* cited by examiner

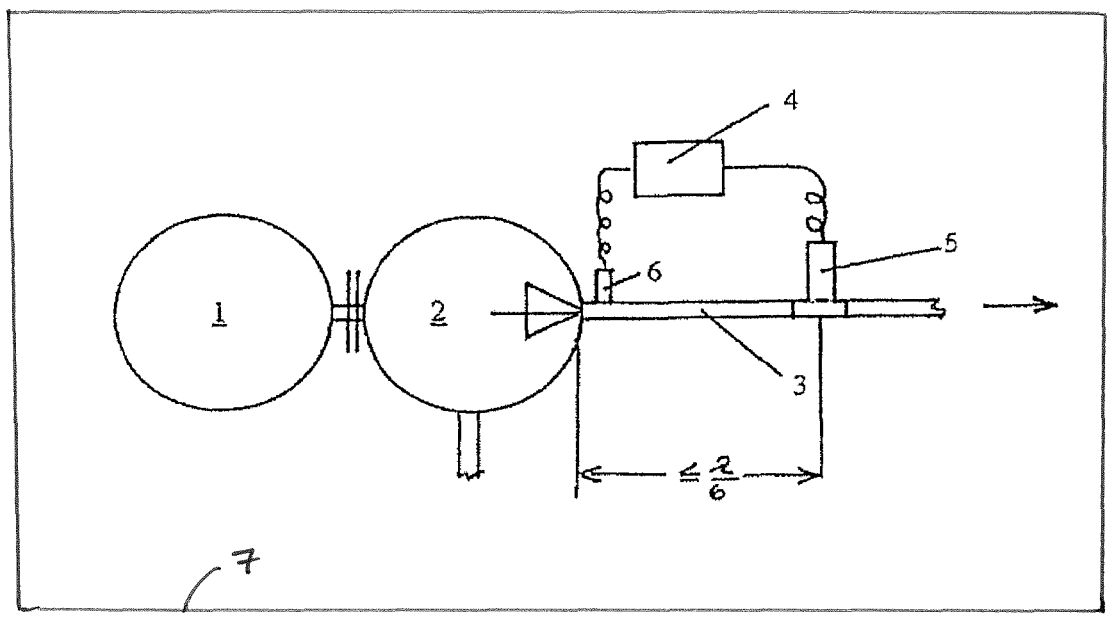

DEVICE FOR REDUCING HYDRAULIC-FLUID OSCILLATION IN A HYDRAULIC SYSTEM

REFERENCE TO RELATED APPLICATIONS

This application claims the benefit of the filing date of German patent application 10 2005 058 547.7, filed on Dec. 8, 2005, and of U.S. Provisional Patent Application No. 60/780,553, filed Mar. 9, 2006, the disclosures of which are hereby incorporated herein by reference.

BACKGROUND OF THE INVENTION

The invention relates to a device for reducing hydraulic-fluid oscillation in a hydraulic system, in particular in a hydraulic system of an aircraft, according to the precharacterising part of claim 1.

Hydraulic systems are used in a wide range of applications for conveying fluids that are used for a host of different purposes and may be conveyed at greatly different pressures. The fluids conveyed at pressure may perform mechanical work for control purposes or motive power purposes; they may be used as fuels or oxidising agents; they may be lubricants or other materials, any fluids, as used in motive power engineering, materials processing etc.

In aircraft, typically, several hydraulic systems that are usually independent are provided, which hydraulic systems by pumps, in particular axial piston pumps, generate the necessary pressure in the systems. In this arrangement pressure pulsation in the hydraulic lines occurs, which pulsation is acoustically perceived as disagreeable noise, and, because such pulsation subjects the lines to additional loads, it may also increase the possibility of leakages occurring. The undesirable side effects associated with such pressure pulsation occur in particular also in the case of pumps of aircraft engines.

According to the state of the art, pressure pulsation of the type mentioned may be reduced by reverberation attenuators, which however on the one hand have to be installed in close proximity to the pumps, and on the other hand, in particular in the case of engine pumps that operate at relatively low frequencies, have to be quite voluminous, which means that because of the lack of space they cannot be accommodated in the engine pylon in close proximity to the pumps.

From DE 103 16 946 A1 a device for attenuating pressure oscillation in a hydraulic line is known, in which device an actuator for generating pressure oscillation in the hydraulic line is arranged between a pressure source in the form of a pump and a consumer. By a control-/regulating device the actuator is to be controlled such that it generates pressure oscillation that is at least approximately in phase opposition to the pressure oscillation detected by a sensor in the hydraulic line. In this known device the actuator that generates the pressure oscillation that is in phase opposition is arranged in the hydraulic line at a smaller distance from the pump, i.e. upstream of the sensor that generates the pressure oscillation.

Furthermore, from the publication "The Vibration Active Control on the Fluid Borne Noise", Jiao Zongxia, Chen Ping, Hua Quing, Wang Shaoping, College of Automation Science and Electrical Engineering, Beijing University of Aeronautics and Astronautics, a device for actively reducing hydraulic fluid oscillation in a hydraulic system is known. This hydraulic system comprises a pump that is provided for conveying the hydraulic fluid in a connected hydraulic fluid line system, and further comprises a first relief valve that is connected to the hydraulic line system. A second relief valve that is furthermore connected to the hydraulic line system is a piezoelectrically operable actively controllable valve that is provided for reducing the hydraulic-fluid oscillation in the hydraulic system. Said valve is actuated by fast Fourier transforms (FFT) carried out in a computer in response to the pressure oscillation registered on the hydraulic system. The hydraulic fluid that is led away by way of the actively controllable valve is collected as a leakage quantity and is returned to the hydraulic system. In addition to the useable feed quantity, the feed pump of this known hydraulic system thus also has to convey the quantity of hydraulic fluid that has been led away by way of the actively controllable valve and that has been collected as a leakage quantity.

Finally, from the Japanese patent abstract 05180390 a device for attenuating noise-generating oscillation in a line is known, in which device a first oscillation sensor is provided near a pump that is considered to be the primary oscillation source, which oscillation sensor is installed on the outside of the line and contains an oscillation acceleration detector, and, at a predetermined distance from said first oscillation sensor, an electromagnetic excitation device that is referred to as the secondary oscillation source is provided on the line. Again at a predetermined space from the electromagnetic excitation device, a second oscillation sensor, which also comprises an oscillation acceleration detector, is provided as a fault sensor. The first oscillation sensor, the fault sensor, and the electromagnetic excitation device are electrically connected to a filter circuit that serves as a regulating device so as to reduce the noise in the line, which noise has been generated by the oscillation.

SUMMARY OF THE INVENTION

It is an object of the invention to create a device for reducing hydraulic-fluid oscillation, which device is effective and requires little space.

This object is solved by a device for reducing hydraulic-fluid oscillation, having the features of claim 1. Advantageous embodiments and improvements of the device according to the invention are stated in the dependent claims.

According to an exemplary embodiment of the invention a device is provided for reducing hydraulic-fluid oscillation in a hydraulic system, in particular in a hydraulic system of an aircraft, wherein the hydraulic system comprises a pump, driven by a drive, which pump conveys a fluid to a hydraulic line by pressure pulsation, and further comprises an actuator, arranged in the hydraulic line, which actuator is provided for generating pressure pulsation that compensates for the pressure pulsation of the pump, wherein the actuator is controlled by a control device as a function of the pressure pulsation occurring in the hydraulic line, and in the hydraulic line a pressure- or oscillation sensor for registering the occurring pressure pulsation is provided, which pressure- or oscillation sensor provides a respective output signal to the control device. According to the invention, the pressure sensor is arranged in the hydraulic line so as to be upstream of the actuator.

The terms "hydraulic system" or "hydraulic line" etc. used in this document are to be interpreted in their widest sense; they refer to any fluid that conforms to the laws of hydraulics, i.e. apart from so-called hydraulic fluid or hydraulic oil they also refer to fuels, lubricants, oxidising agents and any other fluids as used in motive power engineering, materials processing etc.

According to an exemplary embodiment of the invention the components that have to be arranged in close proximity to the pump are very small so that the space requirements both in the case of retrofitting and in the case of new constructions are very modest. This is advantageous in particular in the case of engine pumps of aircraft. According to an exemplary embodiment of the invention apart from noise, mechanical loads acting on the hydraulic system, which mechanical loads result from pressure pulsation, are also reduced.

According to an exemplary embodiment of the invention, the pressure sensor is arranged in the hydraulic line so as to be in close proximity to the outlet of the pump.

According to an exemplary embodiment, the control device controls the actuator with a view to minimising the pressure pulsation registered by the pressure sensor.

According to an exemplary embodiment of the invention, the pressure sensor is arranged in the hydraulic line at a distance of less than/equal to $\lambda/6$ ($\lambda$=characteristic wavelength of the hydraulic-fluid oscillation in the hydraulic line, which hydraulic-fluid oscillation is to be reduced) from the actuator.

According to an exemplary embodiment of the invention the pump may be an axial piston pump.

According to an exemplary embodiment of the invention the actuator may be driven electrically.

According to an exemplary embodiment of the invention the actuator may be driven hydraulically or pneumatically.

According to an exemplary embodiment of the invention, it is provided for the control device to control the actuator with a view to generating pressure pulsation according to frequency and amplitude such that the total of the pressure pulsation of the pump and of the actuator is kept to a minimum.

According to an exemplary embodiment, the control device operates electronically.

According to an exemplary use, the device is provided for reducing hydraulic-fluid noise in engine pumps of an aircraft engine, which engine pumps operate at low frequencies.

In this use the device may advantageously be arranged in the engine pylon.

DETAILED DESCRIPTION OF THE FIGURE

Below, an exemplary embodiment of the invention is explained with reference to the drawing.

The FIGURE shows a diagrammatic view of a device for reducing hydraulic-fluid oscillation, in particular hydraulic-fluid noise in a hydraulic system, in particular in a hydraulic system of an aircraft, according to an exemplary embodiment of the invention.

The device shown in the FIGURE is used for reducing hydraulic-fluid oscillation, in particular hydraulic-fluid noise in a hydraulic system, such as a hydraulic system of an engine (not shown) of an aircraft.

The hydraulic system comprises a pump 2, which is driven by a drive 1 in the form of a motor, typically an axial piston pump that operates at relatively low frequencies. By way of pressure pulsation this pump conveys a fluid (fuel) to the engine by way of a hydraulic line 3.

Arranged in the hydraulic line 3 is an electrically driven actuator 5, which in turn is provided for generating pressure pulsation that is to compensate for the pressure pulsation of the pump 2. The actuator 5 is controlled by an electronically operating analog or digital control device 4 as a function of pressure pulsation that occurs in the hydraulic line 3. The pressure pulsation that occurs in the hydraulic line 3 is registered by a pressure- or oscillation sensor 6 that transmits a corresponding output signal to the control device 4.

The control device 4 controls the actuator 5 with a view to generating pressure pulsation according to frequency and amplitude such that the total of the pressure pulsation of the pump 2 and the actuator 5 is kept to a minimum, in other words so that the pressure pulsation registered by the pressure sensor 6 is minimal.

The actuator 5 may be driven by way of a single harmonic frequency or by way of a fundamental oscillation that is superposed by harmonic oscillation, depending on the type of pressure pulsation generated by the pump 2.

Driving the actuator 5 in response to the output signal generated by the pressure sensor 6 may take place in the manner of forward control, in which the pressure pulsation generated by the actuator 5 is generated according to a predetermined function of the pressure pulsation measured by the pressure sensor, or in the manner of regulation, in which, as described above, the pressure pulsation registered by the pressure sensor 6 becomes minimal.

In the exemplary embodiment shown, the pressure sensor 6 is arranged in the hydraulic line 3 so that it is situated upstream of the actuator 5 and in close proximity to the outlet of the pump 2, while the pressure sensor 6 is arranged in the hydraulic line 3 at a distance of less than/equal to $\lambda/6$ ($\lambda$=characteristic wavelength of the hydraulic-fluid oscillation in the hydraulic line, which hydraulic-fluid oscillation is to be reduced) from the actuator 5, so as to prevent the occurrence of longitudinal resonance in the hydraulic line in the frequency range that is of interest.

The device can, in particular, be arranged in the engine pylon 7 of an aircraft.

It should be noted that the term 'comprising' does not exclude other elements or steps and the 'a' or 'an' does exclude a plurality. Also elements described in association with different embodiments may be combined.

It should be noted that the reference signs in the claims shall not be construed as limiting the scope of the claims.

LIST OF REFERENCE CHARACTERS

1 Motor
2 Pump
3 Hydraulic line
4 Control electronics
5 Actuator
6 Pressure sensor

The invention claimed is:

1. A device for reducing hydraulic-fluid oscillation in an engine pump of an aircraft engine, which engine pump operates at audible frequencies, which engine pump conveys a fluid to a single hydraulic line by pressure pulsations, the device comprising:
    an actuator, arranged in the single hydraulic line for generating pressure pulsations that compensate for the pressure pulsations of the engine pump;
    a control device for controlling the actuator as a function of the pressure pulsations occurring in the single hydraulic line; and
    a sensor in the single hydraulic line for registering the occurring pressure pulsations and configured for providing a respective output signal to the control device,
    wherein the sensor is arranged in the single hydraulic line so as to be upstream of the actuator at a distance of less than or equal to $\lambda/6$ from the actuator, wherein $\lambda$ is a predetermined characteristic wavelength of a predetermined hydraulic oscillation to be reduced in the single hydraulic line.

2. The device of claim 1, wherein the sensor is arranged in the single hydraulic line so as to be in close proximity to an outlet of the engine pump.

3. The device of claim 1, wherein the control device is configured to control the actuator to minimize the pressure pulsations registered by the sensor.

4. The device of claim 1, wherein the engine pump is an axial piston pump.

5. The device of claim 1, wherein the actuator is driven electrically.

6. The device of claim 1, wherein the actuator is driven hydraulically or pneumatically.

7. The device of claim 1, wherein the control device is configured to control the actuator to generate pressure pulsations according to a frequency and an amplitude such that the total pressure pulsations of the engine pump and of the actuator are kept to a minimum.

8. The device of claim 1, wherein the control device operates electronically.

9. The device of claim 1, wherein the device is arranged in an engine pylon of an aircraft.

10. The device of claim 1, wherein said engine pump continuously conveys said fluid.

11. A method for reducing hydraulic-fluid oscillation in an engine pump of an aircraft, comprising:

providing an engine pump which operates at audible frequencies;

conveying a fluid by the engine pump to a single hydraulic line by pressure pulsations;

generating pressure pulsations by an actuator arranged in the single hydraulic line that compensates for the pressure pulsations of the engine pump;

controlling the actuator as a function of the pressure pulsations occurring in the single hydraulic line by a controller;

registering the occurring pressure pulsations by a sensor in the single hydraulic line; and providing a respective output signal to the controller;

wherein the sensor is arranged in the single hydraulic line so as to be upstream of the actuator at a distance of less than or equal to $\lambda/6$ from the actuator, wherein $\lambda$ is a predetermined characteristic wavelength of a predetermined hydraulic oscillation to be reduced in the single hydraulic line.

12. The method of claim 11, wherein the actuator, the sensor, and the controller are arranged in an engine pylon of the aircraft.

13. The method of claim 11, wherein the step of conveying is continuous.

* * * * *